United States Patent [19]

Kilgore

[11] Patent Number: 5,782,276
[45] Date of Patent: Jul. 21, 1998

[54] HORIZONTAL OIL FILTER DISCHARGE CONTROL TOOL

[76] Inventor: Gary Hartman Kilgore, 239 Calumet Pl., San Antonio, Tex. 78209

[21] Appl. No.: 756,435

[22] Filed: Nov. 26, 1996

[51] Int. Cl.⁶ .............................. B65B 39/00; B67C 11/04
[52] U.S. Cl. .................. 141/332; 141/86; 141/311 A; 141/333; 141/330; 184/106
[58] Field of Search .......................... 141/331–333, 141/329, 340, 311 A, 86, 98, 342, 330; 184/106, 1.5; 222/87

[56] References Cited

U.S. PATENT DOCUMENTS

| | | | |
|---|---|---|---|
| 2,058,925 | 6/1936 | Tompkins | 141/332 |
| 4,177,529 | 12/1979 | Kilgore . | |
| 4,266,452 | 5/1981 | Crist . | |
| 4,515,188 | 5/1985 | Brutsman | 141/86 |
| 4,763,620 | 8/1988 | Zastocki . | |
| 4,800,933 | 1/1989 | Moore . | |
| 4,865,727 | 9/1989 | Krauss . | |
| 5,259,426 | 11/1993 | Burleigh . | |
| 5,271,299 | 12/1993 | Wadsworth . | |
| 5,386,748 | 2/1995 | Kilgore . | |
| 5,425,401 | 6/1995 | Boggs | 184/106 |
| 5,454,960 | 10/1995 | Newsom | 184/106 |

*Primary Examiner*—J. Casimer Jacyna
*Assistant Examiner*—Timothy L. Maust

[57] ABSTRACT

A horizontal oil filter discharge control tool is a vessel with an open end, configured to suspend wedged between a loosened oil filter and filter mounting fixture, while a filter drains. The vessel may have two open ends, creating a funnel, or it may have an open end and a closed end. The rim of an open end may be concave in at least one plane. A concavity of one plane is designed to recieve filter diameters within a given set of parameters, while additional concavities may be provided to recieve filter diameters within a different given set of parameters. Blades extending along the interior surface on one surface in each plane and beyond the rim of the vessel, provide a structure from which the vessel is suspended. In operation, the vessel is held beneath a filter prior to rotating and loosening the filter. On rotating the filter, the blades of the vessel are slid between the filter and its' fixture. The filter is then hand tightened, wedging the vessel, by the blades. The filter is left to drain. Once drained: the filter and vessel are removed and, if the vessel has a closed bottom, it is drained into a suitable receptacle.

2 Claims, 9 Drawing Sheets

HORIZONTAL OIL FILTER DISCHARGE CONTROL TOOL

BACKGROUND OF THE INVENTION

Removal of oil filters, water separating fuel filters, and the like from internal combustion engines and machinery generally results in uncontrolled discharge of some quantity of the filtered fluid. In our age, it has become apparent that the shear volume of waste materials we generate makes it important to capture any incremental pollutant at the source of release. Rules pertaining to disposal of spent fuel and lubricants are effectively reducing the impact of careless discharge that was so prevalent in years past. In 1995, I received a U.S. patent for a socket wrench component that I titled Oil Filter Cup, U.S. Pat. No. 5,386,748. The objective of that tool is to control filter discharge by containing the filter and filter socket within a vessel during removal. However, Oil Filter Cup will not contain oil discharged from a horizontally oriented filter. And in the intervening period while marketing that tool, I have spoken to many people who were hoping it was the solution to the horizontal filter discharge problem. A particularly acute problem when the engine is on a boat. Pumping bilge water loaded with petroleum into the water is no longer merely poor form, but a serious and expensive violation of the law. Consequently, I have been giving this problem some consideration. Consumer acceptance demands an inexpensive, simple device. And that is exactly what this tool is: inexpensive; simple in form and function.

SUMMARY OF THE INVENTION

A horizontal oil filter discharge control tool is a simple vessel for directing the flow of fluid released from a horizontally mounted canister filter during removal of the filter. The novel feature of this invention may be incorporated on a funnel or a vessel with a closed bottom. An open end of the vessel may be shaped to mate with the cylindrical surfaces of one or more filter diameters. For instance, the invention may be configured on the rim of a funnel or closed bottom vessel to provide a variety of mateable structures on a single vessel. In such a case, the opposing sides of the vessel, in one plane, are concave with radius X. While the opposing sides of the vessel, in a second plane perpendicular to the first plane, may be concave with radius Y. So that, this discharge control tool can mate with a filter of radius X (approximately) when fitted to a filter in a first orientation. And if configured with additional mating structures, the same tool rotated 90 degrees, can mate with a filter of radius Y (approximately). Blades extending along the interior surface on one wall in each plane and beyond the rim of the vessel, provide a structure from which the vessel is suspended. This is accomplished by: holding the tool beneath a mounted filter that is to be drained; loosening the filter enough to create a space between the filter and mounting fixture sufficient to insert the blades of the tool; inserting the blades; tightening the filter against the blades; allowing the filter to drain into the tool; and subsequent removal of filter and tool.

DESCRIPTION OF PREFERRED EMBODIMENT

Figure 1:
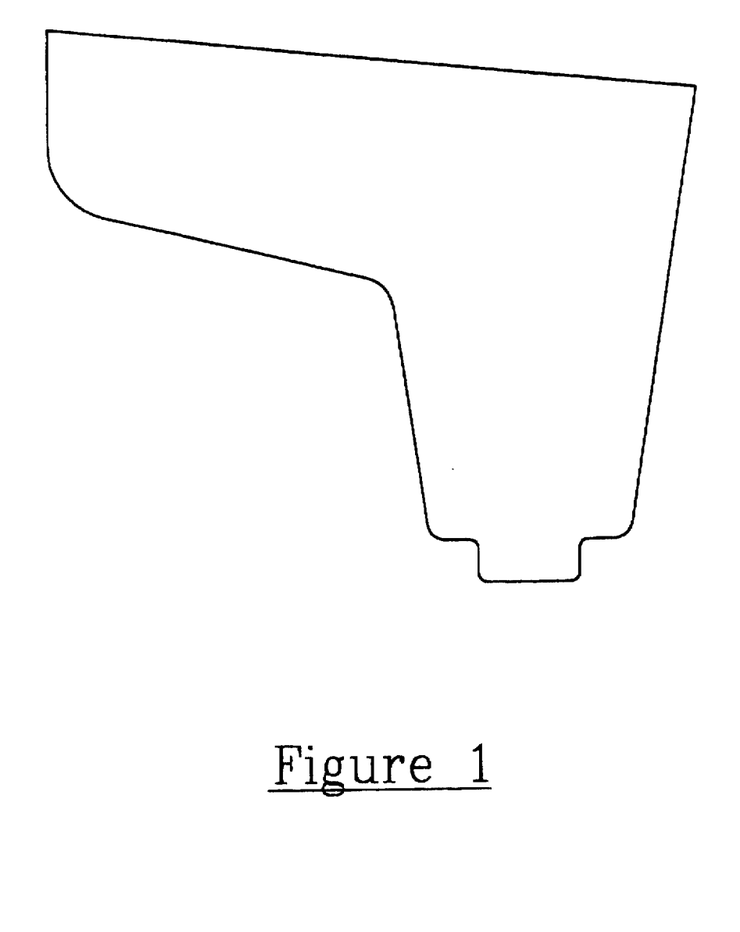
FIG. 1 illustrates a side elevation of a preferred embodiment of the device configured as a funnel.
Figure 2:
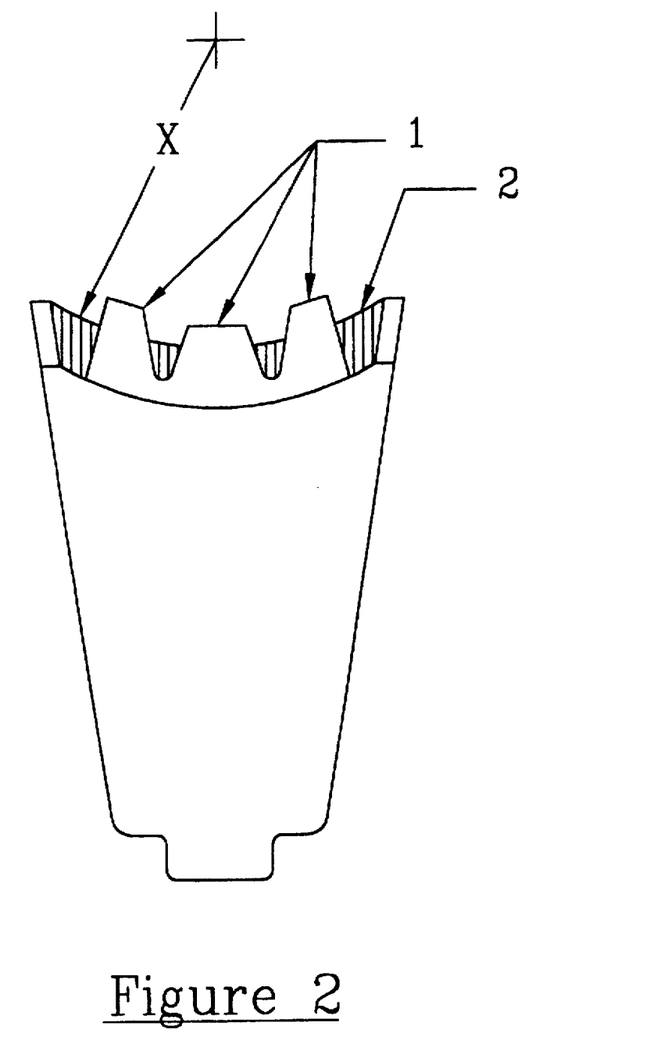
FIG. 2 illustrates a side elevation of the same preferred embodiment of the device configured as a funnel, rotated 90 degrees. From this perspective, the blades (1) are visible protruding from the oil filter/engine receiving open end. The rim (2) is concave to radius X, along the segment defined by concavity A, to accomodate the shape of an oil filter fixture on an engine.
Figure 3:
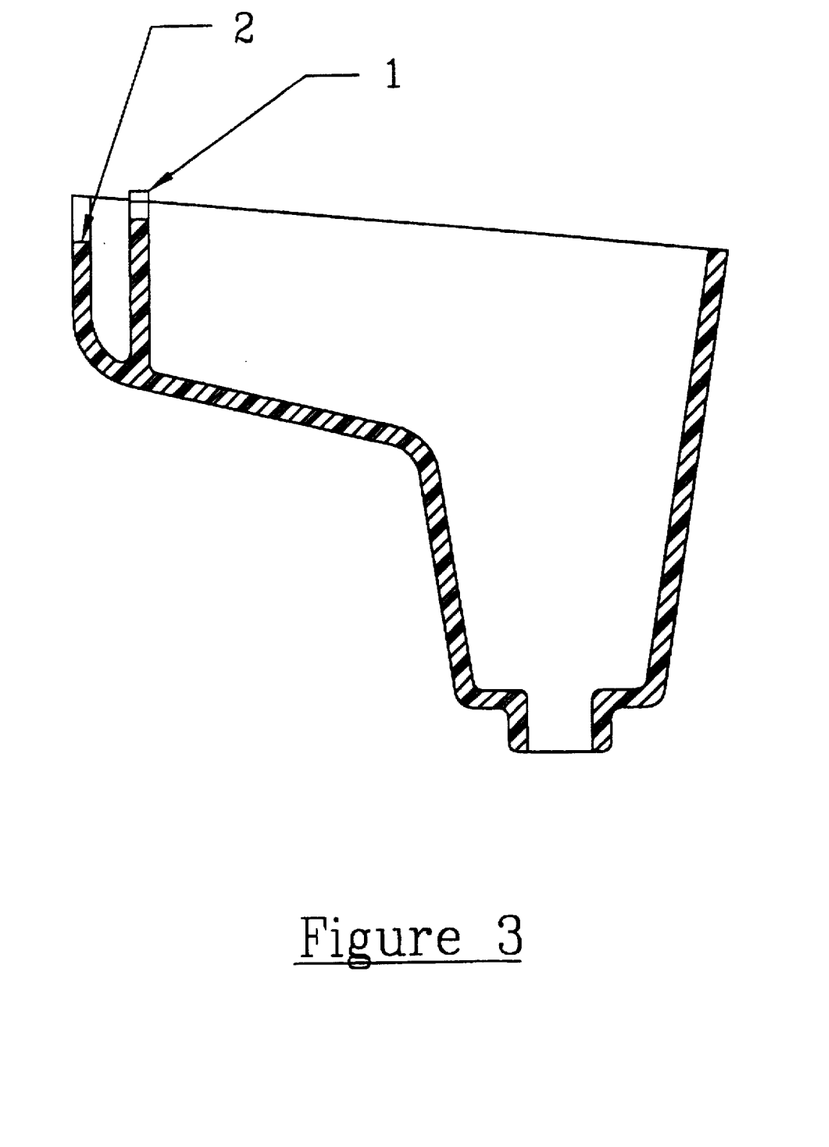
FIG. 3 illustrates the same side elevation as FIG. 1, but in cross-section. The blades (1) project from the interior surface of the device, outwardly.
Figure 4:
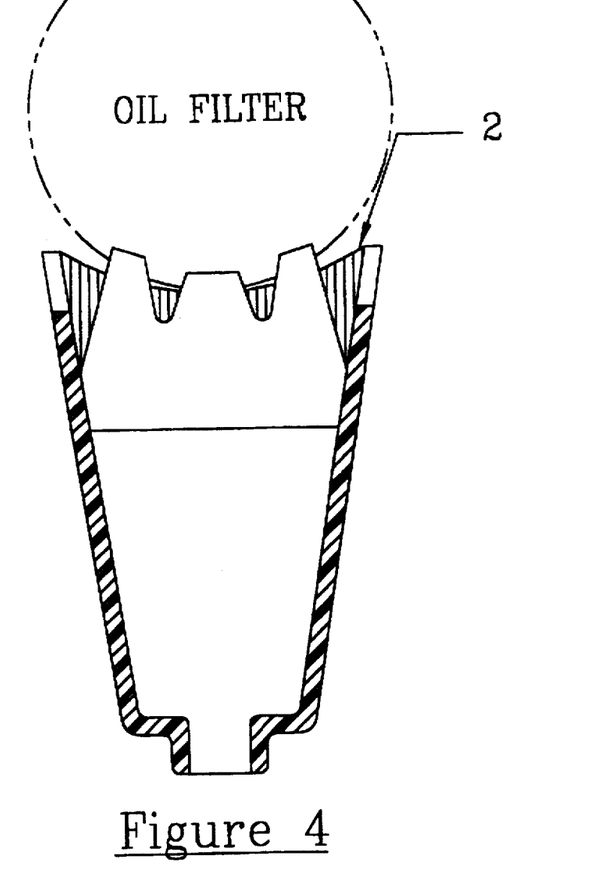
FIG. 4 illustrates the same side elevation as FIG. 2, but in cross-section. The rim (2) is shaped to accomodate the shape of an oil filter fixture on an engine.
Figure 5:
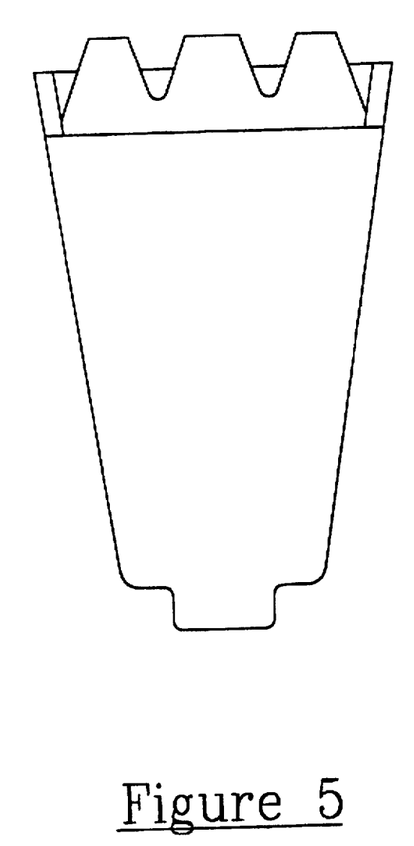
FIG. 5 illustrates a side elevation of a preferred embodiment of the device configured as a funnel, with flat rim.
Figure 6:
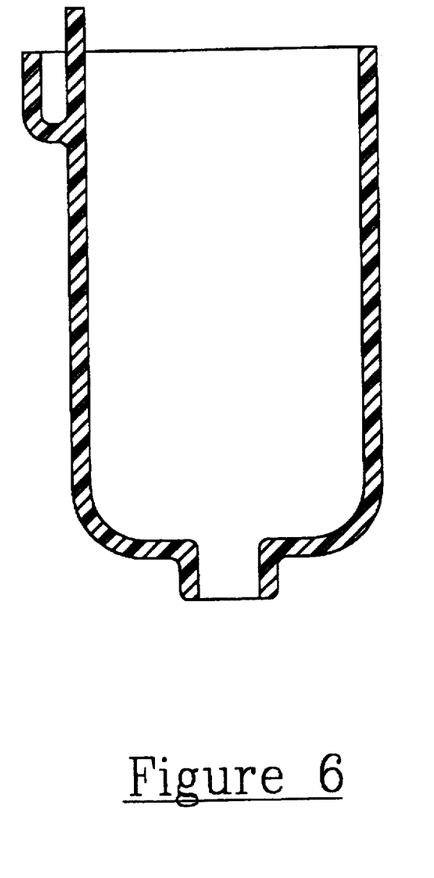
FIG. 6 illustrates a side elevation of a preferred embodiment of the device configured as a funnel, without the elongated rim, illustrated in FIGS. 1 and 3.
Figure 7:
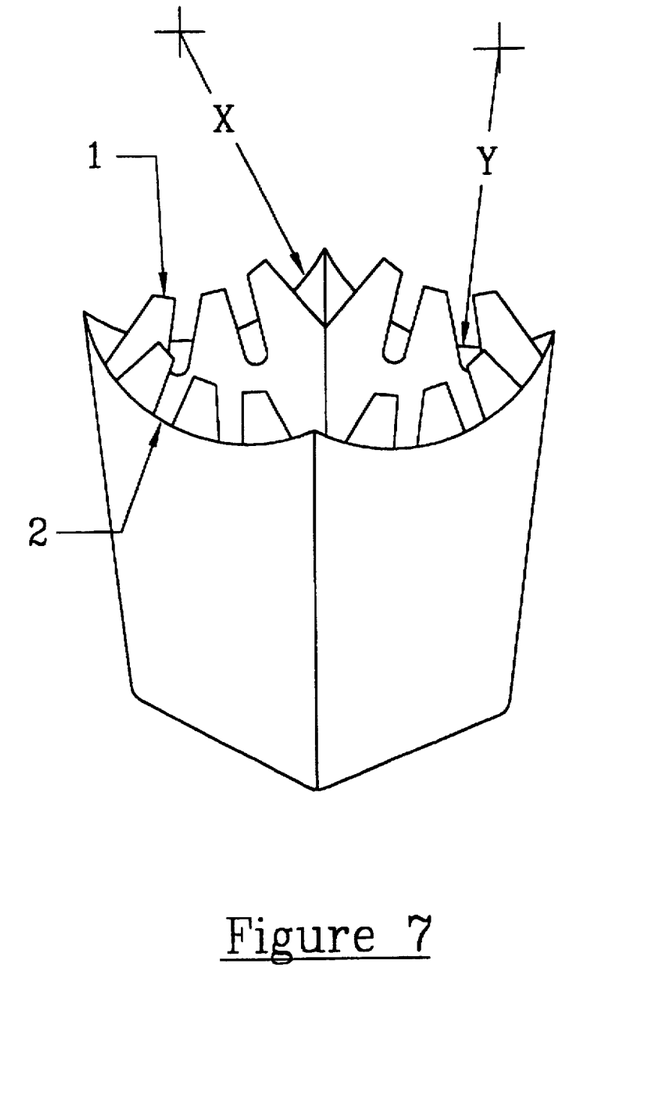
FIG. 7 illustrates a side elevation of a preferred embodiment of the device configured as a fluid retaining vessel. In this embodiment, a segment of the vessel's rim along one side, is concave to radius X, providing concavity A, and along a second side, the rim is concave to radius Y, providing concavity B, thus accomodating oil filter fixtures of different radii. Each side is provided with blades (1).
Figure 8:
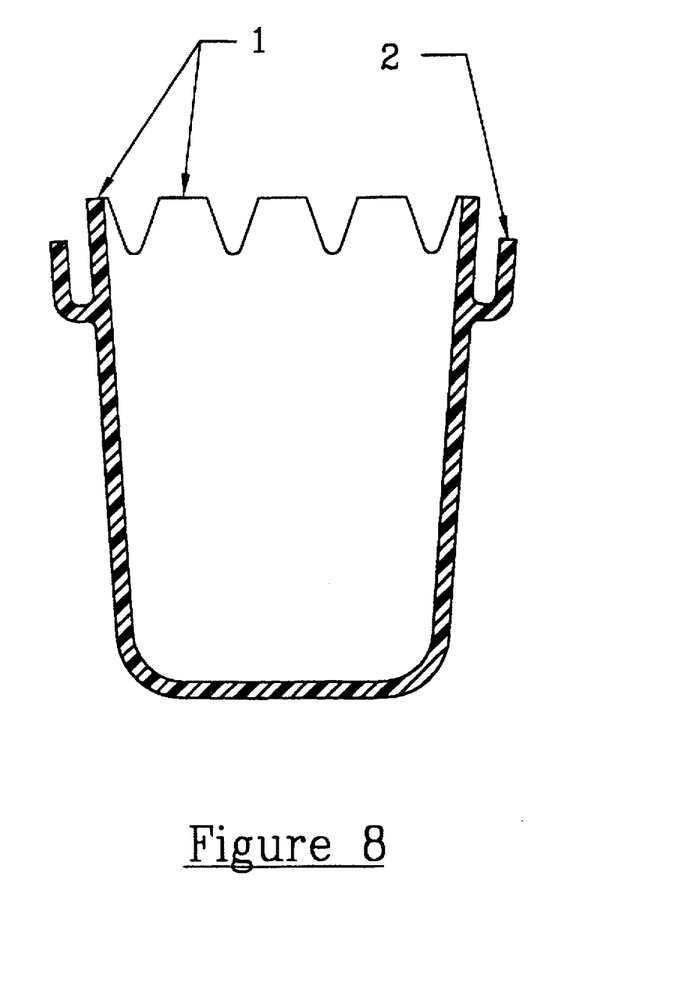
FIG. 8 illustrates a side elevation of a preferred embodiment of the device configured as a fluid retaining vessel, in cross-section.
Figure 9:
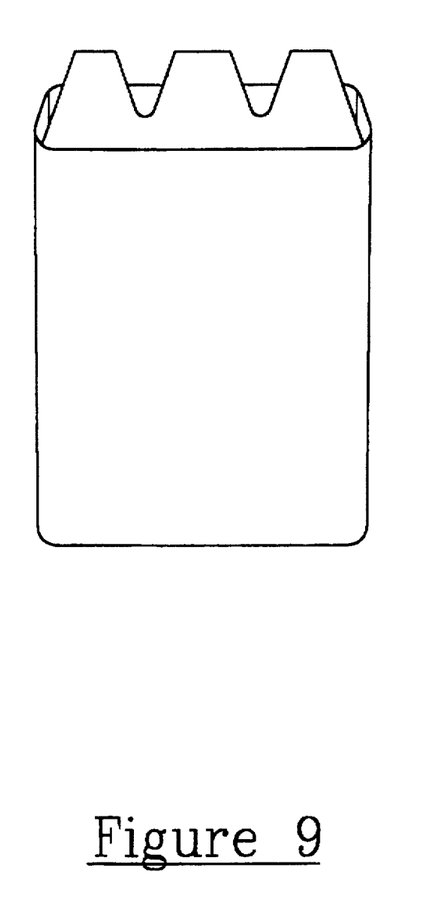
FIG. 9 illustrates a side elevation of a preferred embodiment of the device configured as a fluid retaining vessel, with a flat rim (2).

A horizontal oil filter discharge control tool is a vessel with blades extending from an interior surface, beyond the rim. The vessel may be provided with a bottom, allowing it to retain fluid, or it may be provided with a second opening at the base, allowing fluid to funnel through the vessel. The rim of the vessel may have one or more concave segments, with blades extending from an interior surface and outwardly from the rim at the concave segments.

I claim:

1. A vessel for collecting oil from engines having oil filters of different sizes, said vessel comprising an open end, a bottom and a plurality of sides, at least one side having a rim at said open end, at least one concavity (A) with radius (X) delineating a segment of said rim at said open end, said at least one concavity (A) provide with a plurality of blades adapted to be inserted between an engine and an oil filter projecting from an interior surface of said open end and extending from said interior surface outwardly beyond said rim of said open end of vessel at said segment of said rim defined by said concavity (A).

2. A vessel in accordance with claim 1, including at least one concavity (B) with radius (Y) delineating a segment of a rim at said open end, at least one concavity (B) provided with one or more blades projecting from an interior surface of said vessel and extending from said interior surface beyond said open end of said vessel at said segment of said rim defined by said concavity (B).

* * * * *